J. M. Fletcher,

Churn Dasher.

No. 96,906.    Patented Nov. 16, 1869.

Witnesses
Henry Miller
John A. Ellis

Inventor
J. M. Fletcher
Per
T. H. Alexander
Atty.

United States Patent Office.

J. M. FLETCHER, OF SIDNEY, OHIO.

Letters Patent No. 96,906, dated November 16, 1869.

IMPROVEMENT IN CHURN-DASHER.

The Schedule referred to in these Letters Patent and making part of the same.

*To all whom it may concern:*

Be it known that I, J. M. FLETCHER, of Sidney, in the county of Shelby, and State of Ohio, have invented certain new and useful Improvements in Churn-Dashers; and I do hereby declare that the following is a full, clear, and exact description thereof, reference being had to the accompanying drawings, and to the letters of reference marked thereon, which form a part of this specification, in which—

Figure 1:
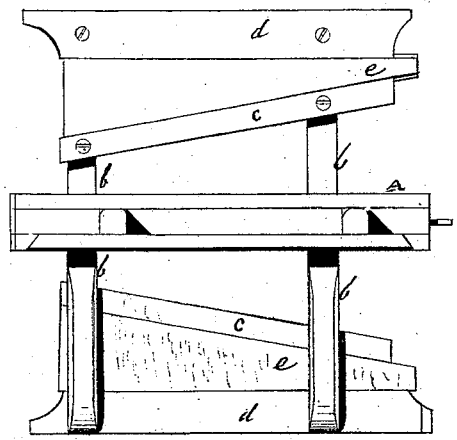

Figure 1 represents a side view of my dasher, and

Figure 2:
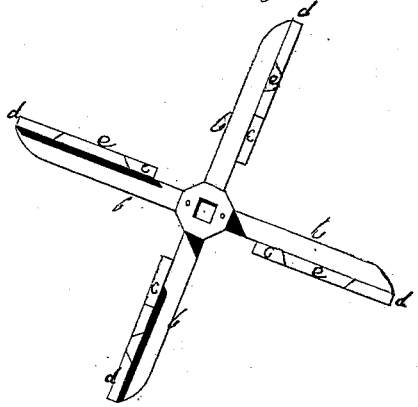

Figure 2, an end view of the same.

The nature of my invention consists in constructing a churn-dasher, with adjustable fliers, in the manner and for the purpose hereinafter set forth.

A, in the annexed drawings, represents the shaft; and b b, the arms, mortised in said shaft at right angles.

At the outer end of each pair of arms are securely fastened the fliers d, and beneath each flier d a second flier, c, is placed, and firmly secured in a diagonal position, by screws.

In the wedge-shaped space between fliers d and c, the dovetailed wedge e is inserted.

It will be seen that the wedge e can be easily removed and replaced, as circumstances may require.

In warm weather, and when the cream is thin, the said fliers can be dispensed with; but when, on the other hand, the cream is thick, they can be used with great advantage.

The use of the wedges e will be found of particular advantage when the butter is to be collected, as they will, in connection with fliers d and c, form a smooth and even surface, from which the butter can be easily gathered.

Having thus described my invention,

What I claim as new, and desire to secure by Letters Patent, is—

1. The adjustable wedges e, when constructed and operated in the manner and for the purpose substantially as set forth.

2. A churn-dasher, furnished with arms b b, fliers d c, and dovetailed wedge e, the whole being constructed and operated as and for the purpose substantially as described.

In testimony that I claim the foregoing as my own, I affix my signature, in presence of two witnesses.

J. M. FLETCHER.

Witnesses:
C. W. FRAZER,
G. NATCHER.